United States Patent
Onishi et al.

(10) Patent No.: US 6,469,808 B1
(45) Date of Patent: Oct. 22, 2002

(54) IMAGE READING APPARATUS AND ILLUMINATOR USED FOR THE SAME

(75) Inventors: Hiroaki Onishi, Kyoto (JP); Hisayoshi Fujimoto, Kyoto (JP); Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/310,609

(22) Filed: May 12, 1999

(30) Foreign Application Priority Data

May 15, 1998 (JP) .......................... 10-133176
Oct. 5, 1998 (JP) .......................... 10-282665

(51) Int. Cl.[7] ................................ H04N 1/04
(52) U.S. Cl. ........................ 358/475; 358/483
(58) Field of Search ................. 358/483, 497, 358/494, 496, 482, 509, 505, 474, 487, 506; 250/208.1, 234–236; 399/220, 211

(56) References Cited

U.S. PATENT DOCUMENTS

| | | | |
|---|---|---|---|
| 4,814,667 A | | 3/1989 | Tanaka |
| 4,901,207 A | | 2/1990 | Sato et al. |
| 5,434,682 A | * | 7/1995 | Imamura ............ 358/474 |
| 5,579,114 A | * | 11/1996 | Imamura ............ 358/482 |
| 5,639,158 A | | 6/1997 | Sato |
| 5,780,840 A | * | 7/1998 | Lee et al. ............ 250/208.1 |
| 5,859,421 A | * | 1/1999 | Onishi et al. ......... 250/208.1 |
| 5,926,286 A | * | 7/1999 | Fujieda ............. 358/475 |
| 5,949,062 A | * | 9/1999 | Matsumoto .......... 250/208.1 |
| 6,166,832 A | * | 12/2000 | Fujimoto ........... 358/484 |

FOREIGN PATENT DOCUMENTS

| | | |
|---|---|---|
| JP | 62169570 | 7/1987 |
| JP | 04029379 | 1/1992 |
| JP | 5-227367 | 12/1993 |
| JP | A-6-86010 | 3/1994 |
| JP | A-6-273602 | 9/1994 |

OTHER PUBLICATIONS

Supplementary Search Report, Feb. 13, 2001.

* cited by examiner

Primary Examiner—Cheukfan Lee
(74) Attorney, Agent, or Firm—Merchant & Gould P.C.

(57) ABSTRACT

An image reading apparatus is provided for reading out images printed on a document. The apparatus includes a casing elongated in the primary scanning direction and a transparent cover supported by the casing. In image-reading operation, the cover is held in sliding contact with a document at an image reading line. The apparatus further includes an insulating substrate attached to the casing, light sources for illuminating the image reading line, light sensors for receiving reflected light coming from the image reading line and a luminosity adjuster supported by the casing for equalizing luminosity along the image reading line.

13 Claims, 17 Drawing Sheets

IMAGE READING APPARATUS AND ILLUMINATOR USED FOR THE SAME

BACKGROUND OF THE INVENTION

1. Field of the Invention

The present invention relates to an image reading apparatus used for reading out images printed on a document sheet for example. The present invention also relates to an illuminator used for such an image reading apparatus.

2. Description of the Related Art

As is well known, devices such as an image scanner and a facsimile machine incorporate an image reading apparatus for reading out images printed on a document sheet. FIG. 23 of the accompanying drawings shows, in section, a conventional contact-type image reading apparatus. The illustrated apparatus includes a resin casing 10e formed with an inner space 11e. The casing 10e has a rectangular configuration elongated in the primary scanning direction.

A rectangular substrate 2e, which is also elongated in the primary scanning direction, is fixed to the bottom of the casing 10e. As shown in FIG. 24, the substrate 2e carries a plurality of light sensors 20e arranged in a row extending in the primary scanning direction. The substrate 2e also carries a plurality of light sources 21e (such as light-emitting diodes for example) which are spaced from each other at regular intervals in the primary scanning direction.

Referring back to FIG. 23, the conventional image reading apparatus 1e is formed with an opening 12e held in communication with the inner space 11e. A transparent cover 3e is fitted into the opening 12e.

A platen P is provided above and held adjacent to the cover 3e for forwarding a document D to be read out. An image reading line L extends on the cover 3e in facing relation to the platen P. Between the image reading line L and the light sensors 20e is provided a lens array 4e.

In the conventional image reading apparatus 1e, when the platen P is rotated, the document D, which is held in sliding contact with the cover 3e at the image reading line L, is forwarded. During this operation, the document D is illuminated, at the image reading line L, by light emitted from the light sources 21e. Then, the light reflected on the document D passes through the lens array 4e to be received by the light sensors 20e. Finally, each of the light sensors 20e will output analog image signals based on the received light.

The image reading apparatus described above has been found disadvantageous in the following point.

As shown in FIG. 24, the light sources 21e are spaced from each other at predetermined distances. In this arrangement, the luminosity at each point on the image reading line L cannot be uniform. Specifically, as shown in FIG. 25, the luminosity becomes greatest at particular points on the reading line L that are closest to the respective light sources 21e, whereas it becomes weaker between these particular points.

When the luminosity along the reading line L is nonuniform, as stated above, it is difficult or even impossible to obtain proper image signals from the light sensors 20e. Clearly, the subsequent printing operation based on such improper image signals will not be performed properly. Under these circumstances, images to be reproduced on a recording paper sheet will unfavorably be different in appearance from the original images on the document.

The above problem may be overcome by increasing the number of the light sources 21e mounted on the substrate 2e. This solution, however, will give rise to another problem, i.e., higher production costs.

SUMMARY OF THE INVENTION

It is, therefore, an object of the present invention is to provide an image reading apparatus which eliminates or reduces the above-described problems.

Another object of the present invention is to provide an illuminator advantageously used in such an image reading apparatus.

According to a first aspect of the present invention, there is provided an image reading apparatus for reading out images printed on a document comprising:

a casing formed with an inner space, the casing being elongated in a primary scanning direction;

a transparent cover supported by the casing, the cover being held in sliding contact with the document at an image reading line;

an insulating substrate attached to the casing;

a plurality of light sources mounted on the substrate for illuminating the image reading line, the light sources being arranged in a first row extending in the primary scanning direction;

a plurality of light sensors mounted on the substrate for receiving reflected light coming from the image reading line, the light sensors being arranged in a second row extending in the primary scanning direction; and luminosity-adjusting means supported by the casing for equalizing luminosity along the image reading line.

According to a preferred embodiment of the present invention, the luminosity-adjusting means may include at least one luminosity adjuster for shielding part of light emitted from the light sources.

Preferably, the luminosity-adjusting means may include an additional luminosity adjuster for shielding part of light emitted from the light sources. The additional luminosity adjuster may be arranged below said one luminosity adjuster.

According to the preferred embodiment, the first-mentioned one luminosity adjuster may be provided with a plurality of protrusions arranged in the primary scanning direction. Each of the protrusions is arranged to positionally coincide with one of the light sources in the primary scanning direction.

Preferably, each of the protrusions may have a triangular configuration. Alternatively, each of the protrusions may have a smooth, wave-like contour, or have a rectangular configuration.

According to a preferred embodiment, the luminosity-adjusting means may be formed integrally with the casing.

According to another preferred embodiment, the luminosity-adjusting means may be formed separately from the casing.

According to a preferred embodiment, the luminosity-adjusting means may include at least one luminosity adjuster for allowing part of light emitted from the light sources to exit from the inner space of the casing.

In the above instance, said one luminosity adjuster may be provided with a plurality of protrusions arranged in the primary scanning direction, each of the protrusions being disposed between two adjacent light sources in the primary scanning direction.

According to a preferred embodiment, the luminosity-adjusting means may include a plurality of first reflective partitions spaced from each other in the primary scanning direction. Each of the first reflective partitions is disposed between two adjacent light sources.

Preferably, each of the first reflective partitions may have a reflectance of 90–98%.

Preferably, the luminosity-adjusting means may further include a plurality of second reflective partitions, each of the second reflective partitions being disposed above a corresponding one of the light sources.

Said each of the second reflective partitions may have a bottom surface spaced from said corresponding one of the light sources by a predetermined distance.

Preferably, the bottom surface of said each of the second reflective partitions may have a reflectance of 90–98%.

According to a second aspect of the present invention, there is provided an illuminator comprising:

a plurality of light sources arranged in a line extending in a predetermined direction; and a plurality of first reflective partitions spaced from each other in the predetermined direction, each of the first reflective partitions being disposed between two adjacent light sources.

Preferably, said each of the first reflective partitions may have a reflectance of 90–98%.

Preferably, the illuminator may further comprise a plurality of second reflective partitions each of which is disposed above a corresponding one of the light sources.

Other objects, features and advantages of the present invention will become clearer from the detailed description of preferred embodiments given below with reference to the accompanying drawings.

DETAILED DESCRIPTION OF THE PREFERRED EMBODIMENTS

The preferred embodiments of the present invention will be described below with reference to FIGS. 1–22 of the accompanying drawings.

Reference is first made to FIGS. 1–5 which show a contact-type image reading apparatus A1 according to a first embodiment of the present invention.

Figure 1:
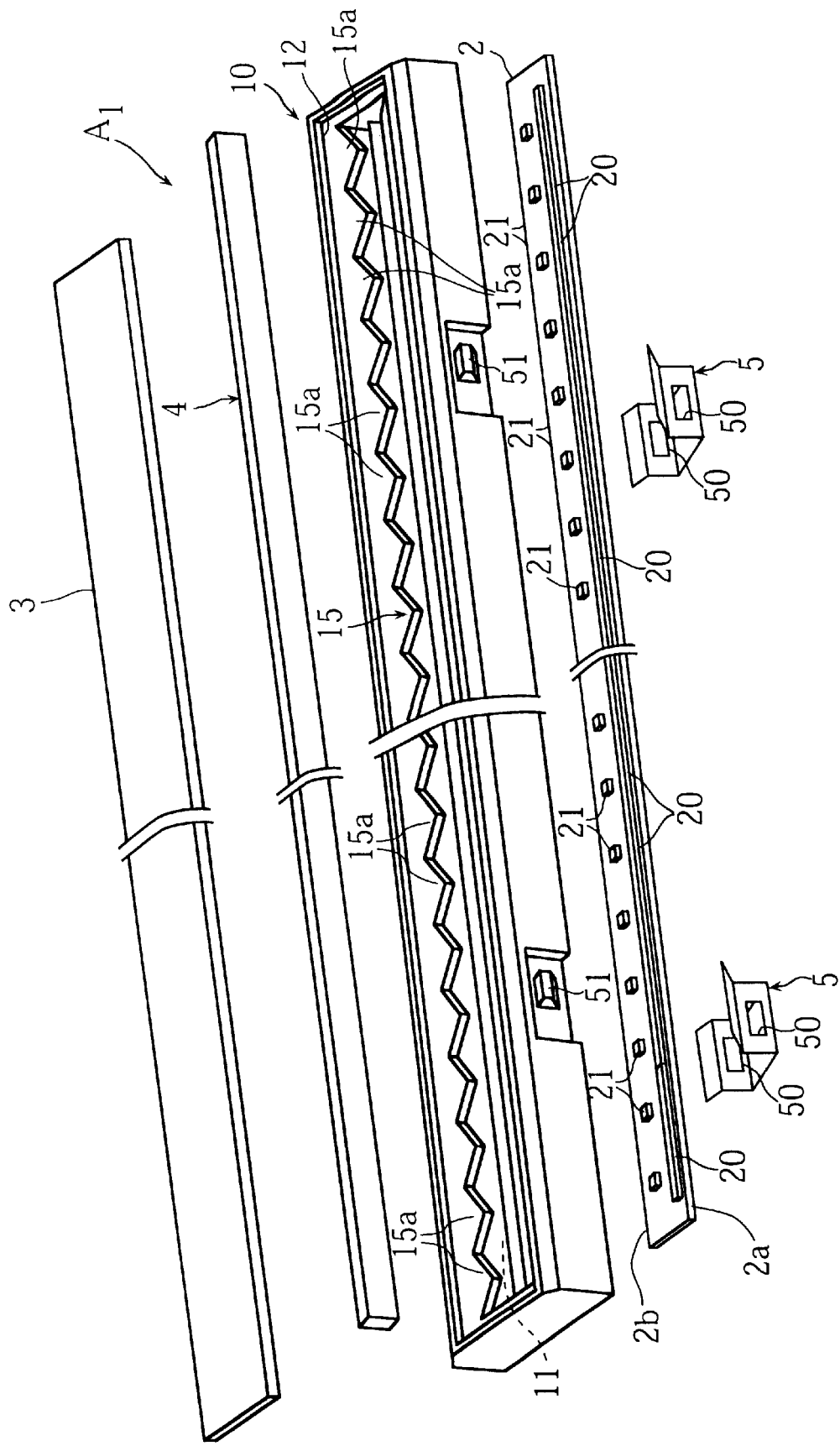
FIG. 1 is an explosive, perspective view showing an image reading apparatus according to a first embodiment of the present invention.

As shown in FIG. 1, the image reading apparatus A1 includes a casing 10 made of e.g. synthetic resin, a rectangular, insulating substrate 2, a transparent glass cover 3 and a lens array 4. The casing 10, the substrate 2, the cover 3 and the lens array 4 have all an elongated configuration extending in a primary scanning direction Pd (see FIG. 2).

The image reading apparatus A1 is provided with a plurality of light sensors 20 and a plurality of light sources 21. These light sensors and light sources are mounted on the substrate 2. As shown in FIG. 1, the light sensors 20 are arranged in a row extending along a longitudinal side edge 2a of the substrate 2, while the light sources 21 are arranged along the opposite longitudinal side edge 2b. The light sources 21 are spaced from each other at predetermined intervals. Each of the light sources 21 may comprise a light-emitting diode (LED) for example.

Though not illustrated, each of the light sensors 20 includes a plurality of light receiving elements (such as phototransistors). In order to read out images printed on e.g. a DIN-A4-size document with reading density of 8 dots/mm, 1728 light receiving elements need to be arranged in the primary scanning direction. In this instance, use may be made of 18 light sensors each of which is provided with 96 light receiving elements.

Figure 2:
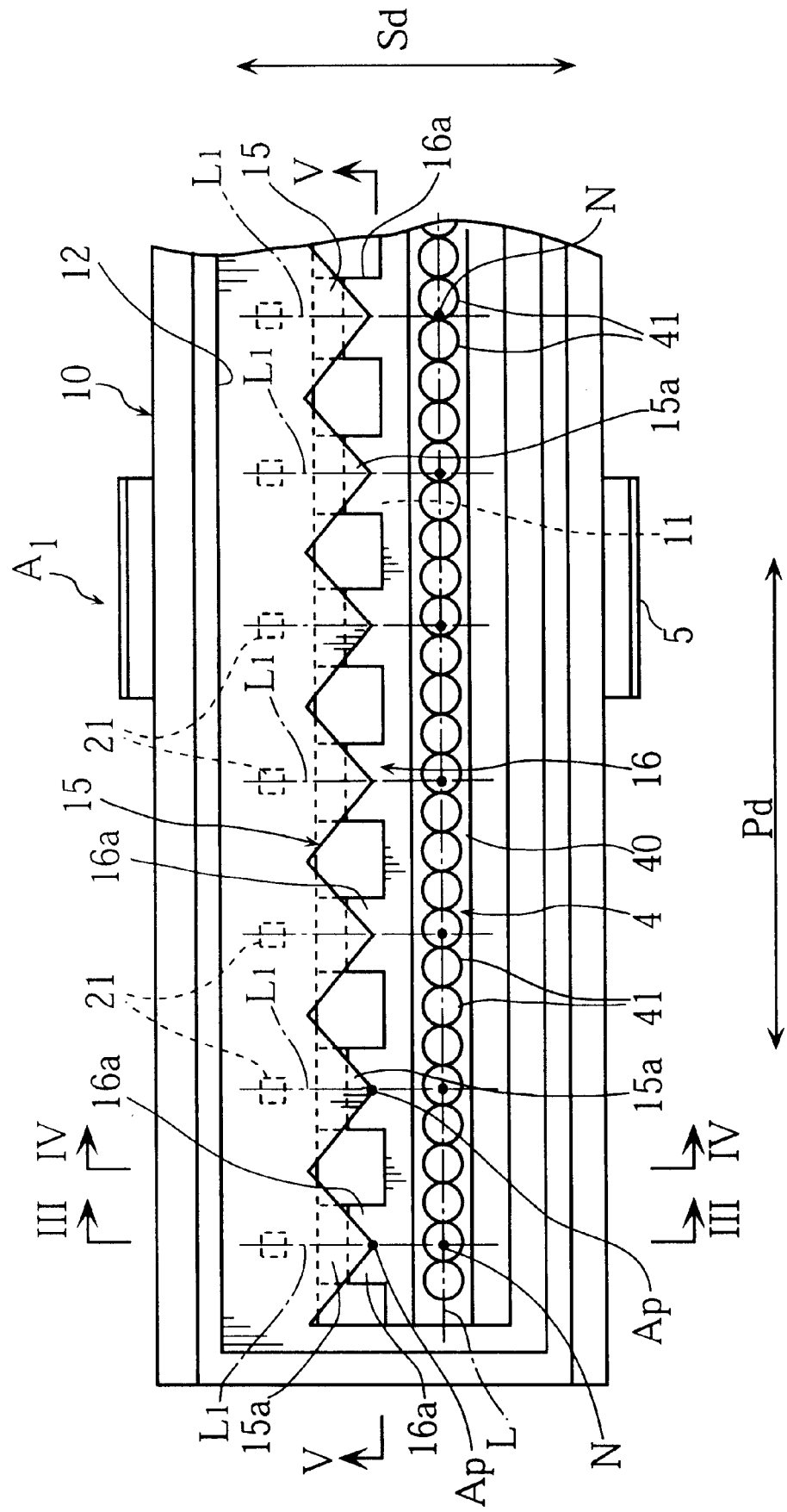
FIG. 2 is a plan view showing principal parts of the image reading apparatus of FIG. 1.
Figure 3:
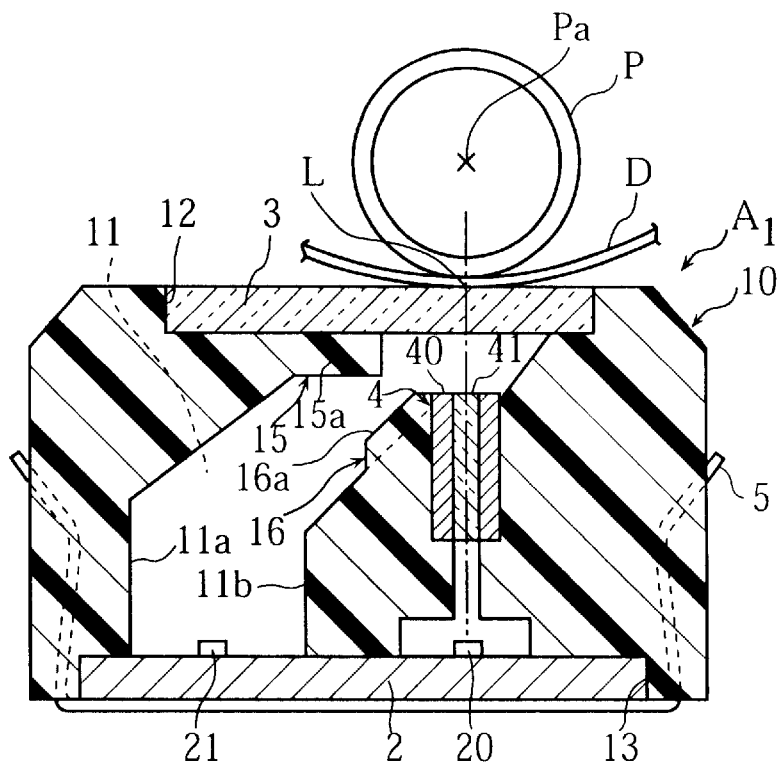
FIG. 3 is a sectional view taken along lines III—III in FIG. 2.

As shown in FIGS. 2 and 3, the lens array 4 includes a lens holder 40 and a plurality of rod lenses 41 which are held by the lens holder 40. The function of the lens array 4 is to focus the original images (printed on a document D) onto the light sensors 20. Preferably, each of the rod lenses 41 may be a self-focusing lens. In this case, the original images are projected onto the light sensors 20 without being altered in size and orientation.

Referring to FIGS. 1 and 3, the casing 10 is formed with an inner space 11 extending in the primary scanning direction. As shown in FIG. 3, the inner space 11 is defined, in cross section, by a first and a second inner surfaces 11a, 11b of the casing 10. The casing 10 is also formed with an upper opening 12 for fixing the cover 3 and with a lower opening 13 for fixing the substrate 2. Both the openings 12, 13 communicate with the inner space 11.

The substrate 2 is releasably accommodated in the lower opening 13 of the casing 10. To this end, use is made of two elastic attachments 5, as shown in FIG. 1. Specifically, the casing 10 has two longitudinal side walls each of which is formed with two engaging projections 51, while each of the attachments 5 is formed with engaging bores 50. With such an arrangement, the substrate 2 will be held in place by fitting the attachments 5 on the casing 10 from below, so that the engaging projections 51 are received in the bores 50 of the attachments 5.

As shown in FIG. 3, the upper portion of the inner space 11 is slanted toward the lens array 4. In this arrangement, light emitted from the light sources 21 is properly led to an image reading line L on the cover 3.

Preferably, the first inner surface 11a and the second inner surface 11b of the casing 10 may be rendered white (or any other light color), so that light is efficiently reflected on these surfaces. Preferably, the first and the second inner surfaces 11a, 11b may have a reflectance of 90–98%. Such white inner surfaces can be provided by making the entire casing 10 of a white synthetic resin material such as polycarbonate containing titanium oxide. Alternatively, white sheets may be stuck on the first and the second inner surfaces 11a, 11b.

Figure 4:
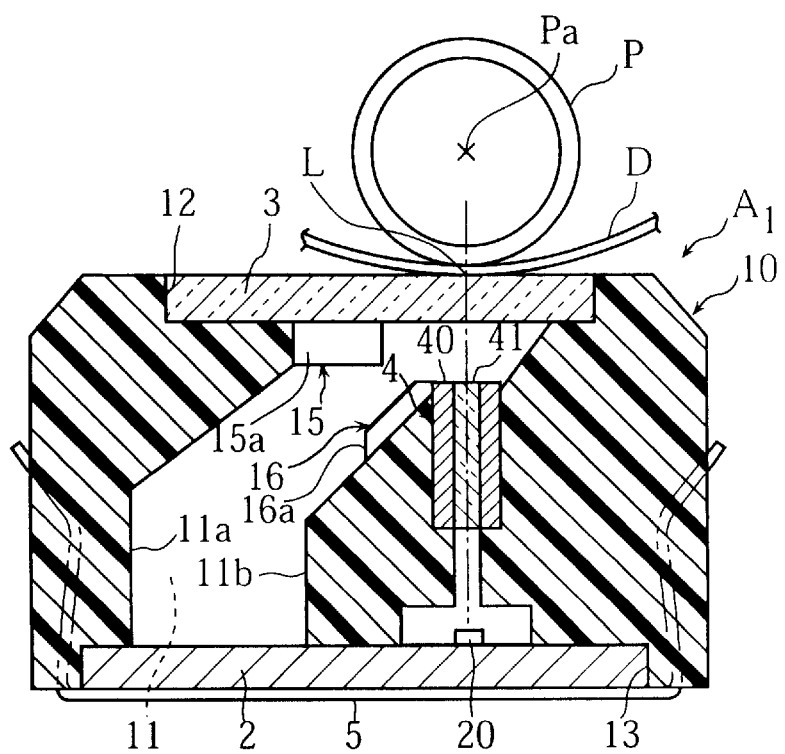
FIG. 4 is a sectional view taken along lines IV—IV in FIG. 2.

As shown in FIGS. 3 and 4, the image reading apparatus A1 further includes a platen P for forwarding the document D. The platen P is arranged immediately above the cover 3. Though positionally fixed relative to the casing 10, the platen P is rotated about its rotation axis Pa by a driving mechanism (not shown). By being controlled by the non-illustrated driving mechanism, the platen P is selectively operated in continuous mode or in intermittent mode.

Referring to FIGS. 2–5, the image reading apparatus A1 is provided with an upper luminosity adjuster 15 and a lower luminosity adjuster 16. In the illustrated embodiment, the upper and lower luminosity adjusters 15, 16 are integrally formed with the casing 10. Such a casing may be produced by molding for example.

The upper luminosity adjuster 15 includes a plurality of first protrusions 15a projecting toward the lens array 4. (see FIG. 3). As shown in FIG. 2, the first protrusions 15a have a triangular configuration with an apex Ap and are adjacently disposed in a row extending in the primary scanning direction Pd. Each of the first protrusions 15a corresponds in position to one of the light sources 21.

Specifically, the apex Ap of each first protrusion 15a and the corresponding one of the light sources 21 are spaced from each other in a secondary scanning direction Sd which is perpendicular to the primary scanning direction Pd. Thus, as viewed above, the apex Ap of each first protrusion 15a and the corresponding light source 21 are on the same line L1 extending in the secondary scanning direction Sd. In this arrangement, the first protrusions 15a serve to shield upwardly-traveling light emitted by the light sources 21.

Figure 5:
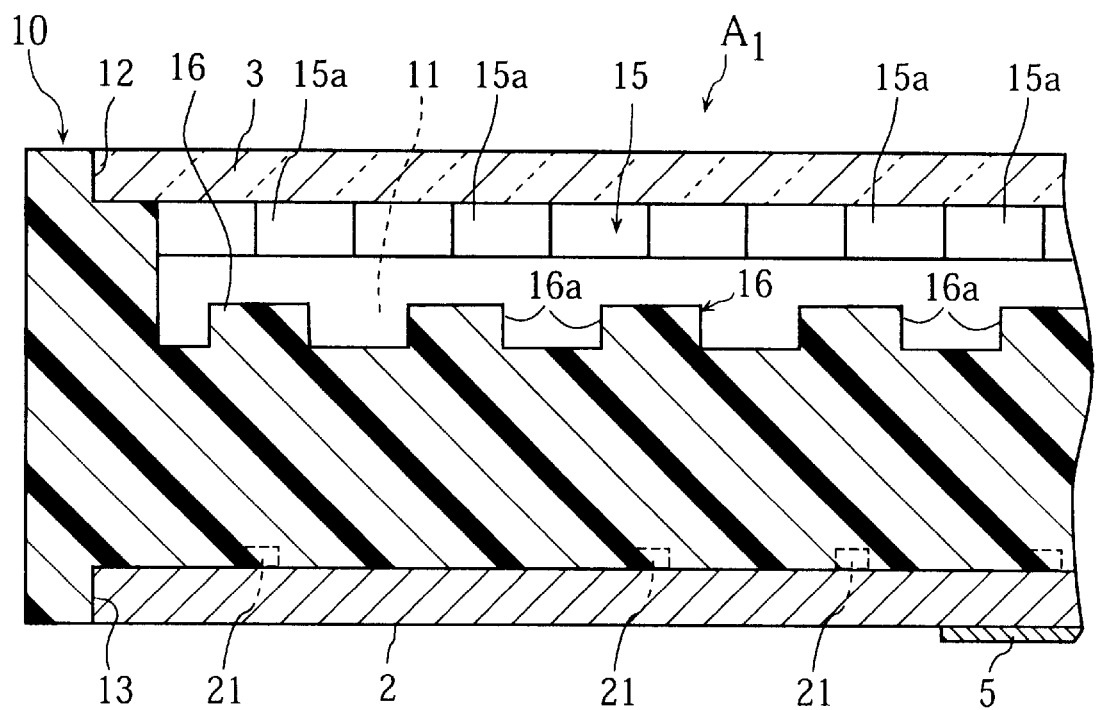
FIG. 5 is a sectional view taken along lines V—V in FIG. 2.

Similarly, the lower luminosity adjuster 16 includes a plurality of second protrusions 16a projecting upwardly (FIG. 3). The second protrusions 16a are disposed at predetermined regular intervals in a row extending in the primary scanning direction Pd (see FIG. 2). The second protrusions 16a do not permit penetration of light. In the illustrated embodiment, each of the second protrusions 16a has a trapezoidal cross section (FIG. 3) and a rectangular cross section (FIG. 5). It should be noted, however, that the second protrusions 16a may have other cross-sectional configurations such as triangular or semicircular configurations.

As viewed from above (FIG. 2), each of the first protrusions 15a overlaps a corresponding one of the second protrusions 16a. In side view (FIG. 3), the first protrusion 15a faces the corresponding second protrusion 16a across the inner space 11.

The image reading apparatus A1 having the above arrangement has the following advantage.

Figure 25:
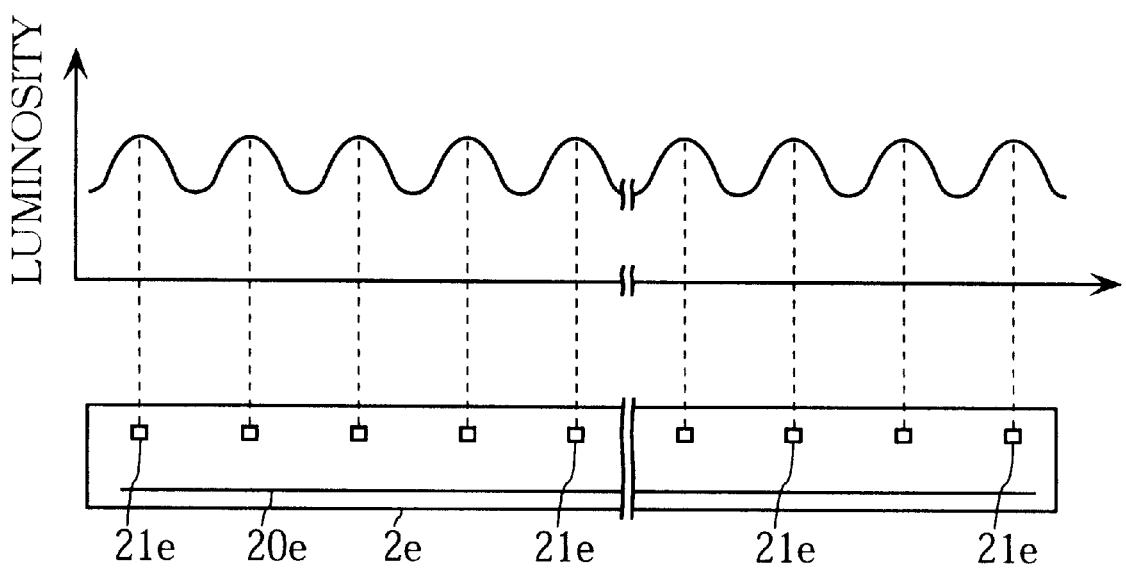
FIG. 25 illustrates how luminosity varies along the reading line of the conventional image reading apparatus.

As previously stated with reference to a conventional image reading apparatus, when light sources are spaced from each other in the primary scanning direction, the luminosity over the image reading line will be rendered uneven (see FIG. 25). According to the first embodiment of the present invention, however, this problem is overcome by utilizing the first and the second protrusions 15a, 16a.

Specifically, referring to FIG. 2, when no countermeasures are taken (as in the conventional image reading apparatus), the mutually-separated light sources 21 will illuminate only some particular points N on the image reading line L with the maximum brightness, but fail to illuminate the other points on the line L with the equal brightness. (The points N are places where the lines L1 and the image reading line L intersect.) In the first embodiment, however, part of the upwardly-traveling light from the light sources 21 is shielded (or scattered) by the first and the second protrusions 15a, 16a of the upper and the lower luminosity adjusters 15, 16. In this manner, it is possible to lower the otherwise greatest luminosity at the particular points N, so that the overall luminosity along the image reading line L is equalized. The equalization of the luminosity is advantageous since it serves to cause the light reflected on the document D to convey proper information about the images on the document D.

Figure 6:
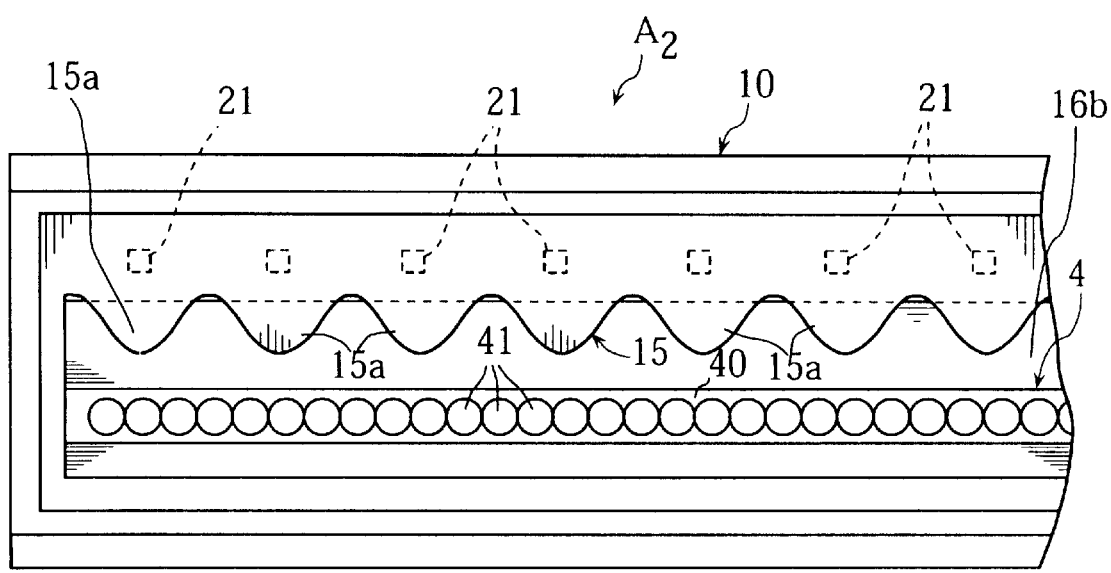
FIG. 6 is a plan view showing principal parts of an image reading apparatus according to a second embodiment of the present invention.

FIG. 6 shows principal parts of an image reading apparatus A2 according to a second embodiment of the present invention. The illustrated apparatus A2 is basically similar to the apparatus A1 of the first embodiment except for the following two points. First, in the apparatus A2, use is made of only a single luminosity adjuster 15 (which corresponds to the upper luminosity adjuster of the first embodiment) for shielding light emitted from light sources 21. Second, the luminosity adjuster 15 is formed with a plurality of protrusions 15a which differ in configuration from the first protrusions 15a of the first embodiment. As illustrated, each of the protrusions 15a of the second embodiment has a smooth, wave-like contour.

Figure 7:
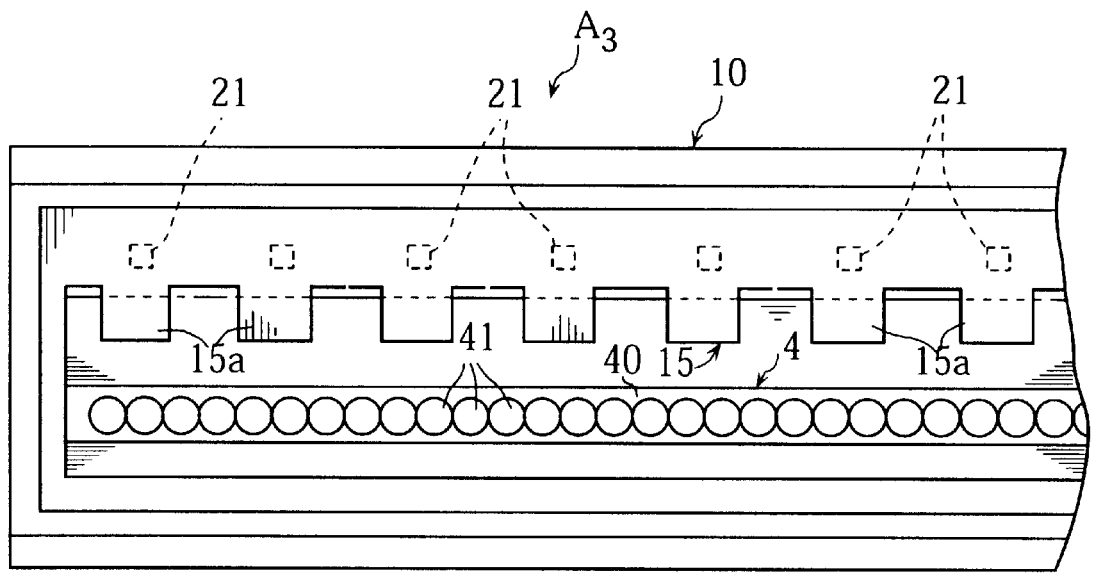
FIG. 7 is a plan view showing principal parts of an image reading apparatus according to a third embodiment of the present invention.

FIG. 7 shows principal parts of an image reading apparatus A3 according to a third embodiment of the present invention. In the apparatus A3, as in the above apparatus A2, use is made of only a single luminosity adjuster 15 for shielding light emitted from light sources 21. As illustrated, the luminosity adjuster 15 is formed with a plurality of protrusions 15a each of which has a rectangular configuration.

Figure 8:
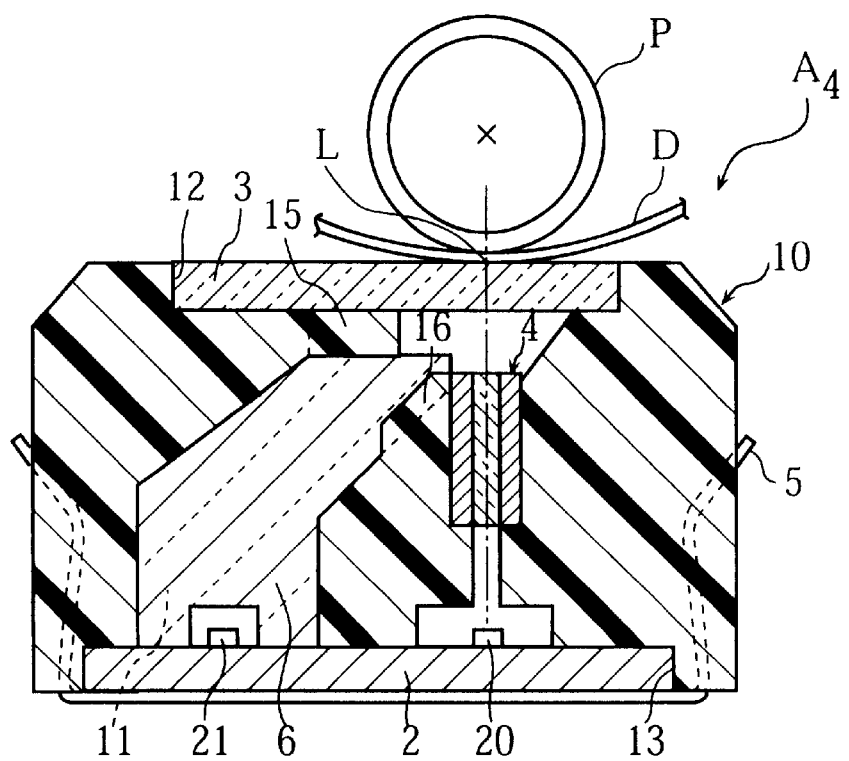
FIG. 8 is a sectional view showing principal parts of an image reading apparatus according to a fourth embodiment of the present invention.
Figure 9:
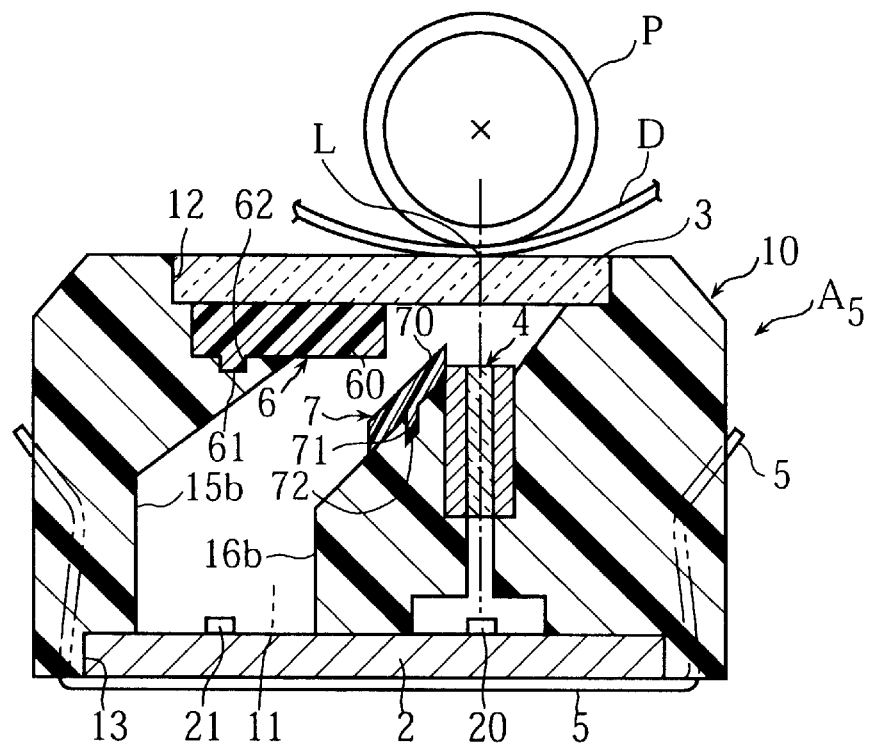
FIG. 9 is a sectional view showing an image reading apparatus according to a fifth embodiment of the present invention.
Figure 10:
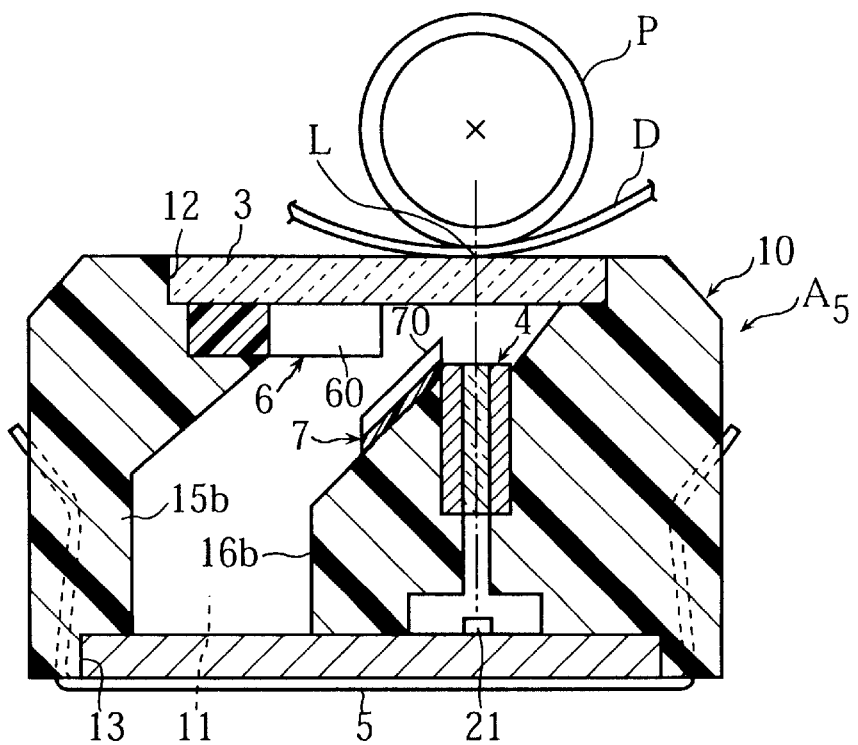
FIG. 10 is a different sectional view showing the image reading apparatus of the fifth embodiment.

FIG. 8 is a sectional view showing an image reading apparatus A4 according to a fourth embodiment of the present invention. In the fourth embodiment, use is made of a transparent light-conducting member 6 arranged in an inner space 11 of a casing 10. The light-conducting member 6 may be made of an acrylic resin material such as PMMA or poly(methyl methacrylate). The light-conducting member 6 is provided for guiding light from light sources 21 to an image reading line L. In this embodiment again, upper and lower luminosity adjusters 15, 16 are utilized.

Reference is now made to FIGS. 9–12 showing an image reading apparatus A5 according to a fifth embodiment of the present invention. The illustrated apparatus A5 is basically similar in arrangement to the apparatus A1 of the first embodiment, except that upper and lower luminosity adjusters 6, 7 are produced separately from a casing 10. In respect of light-shielding performance, the upper and the lower luminosity adjusters 6, 7 of the fifth embodiment are the same as the counterparts of the first embodiment.

Figure 11:
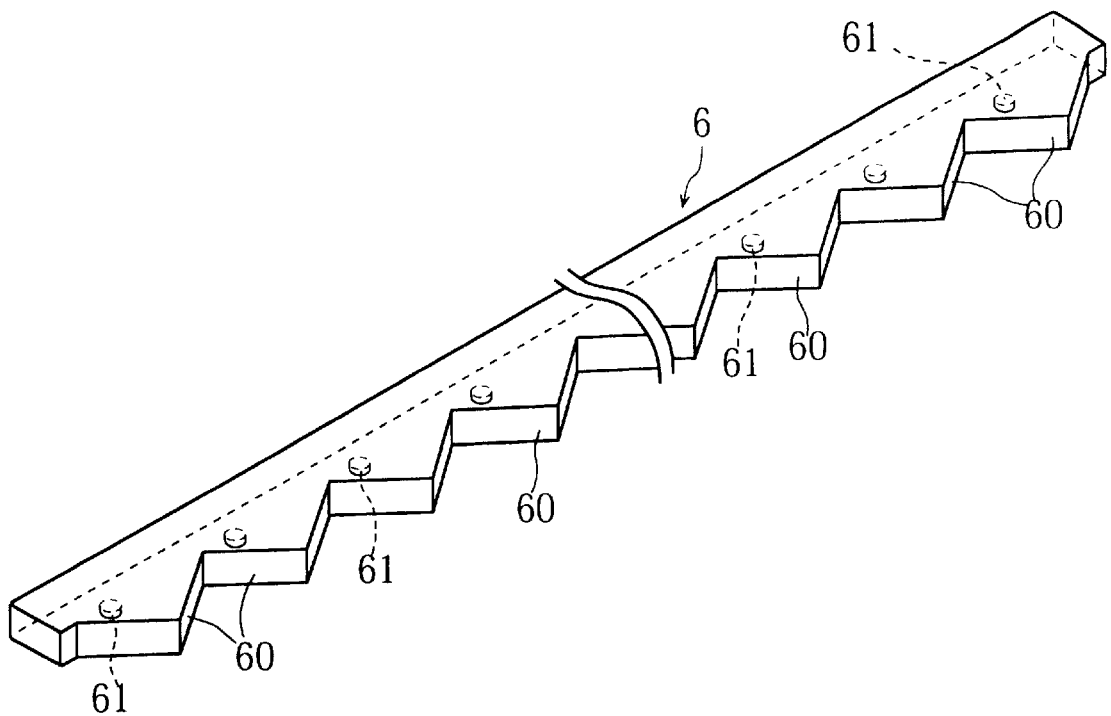
FIG. 11 is a perspective view showing a luminosity-adjusting member used in the image reading apparatus of the fifth embodiment.

As shown in FIG. 11, the upper luminosity adjuster 6 has an elongated body which is formed with a plurality of first protrusions 60. As illustrated, the first protrusions 60 are regularly arranged in a row extending longitudinally of the upper luminosity adjuster 6. In a plan view, each of the first protrusions 60 has a rectangular configuration. The upper luminosity adjuster 6 has a bottom surface formed with a plurality of fixing portions 61 projecting downward from the bottom surface. Correspondingly, the casing 10 is formed with engaging bores 62 into which the fixing portions 61 are fitted (see FIG. 9).

Figure 12:
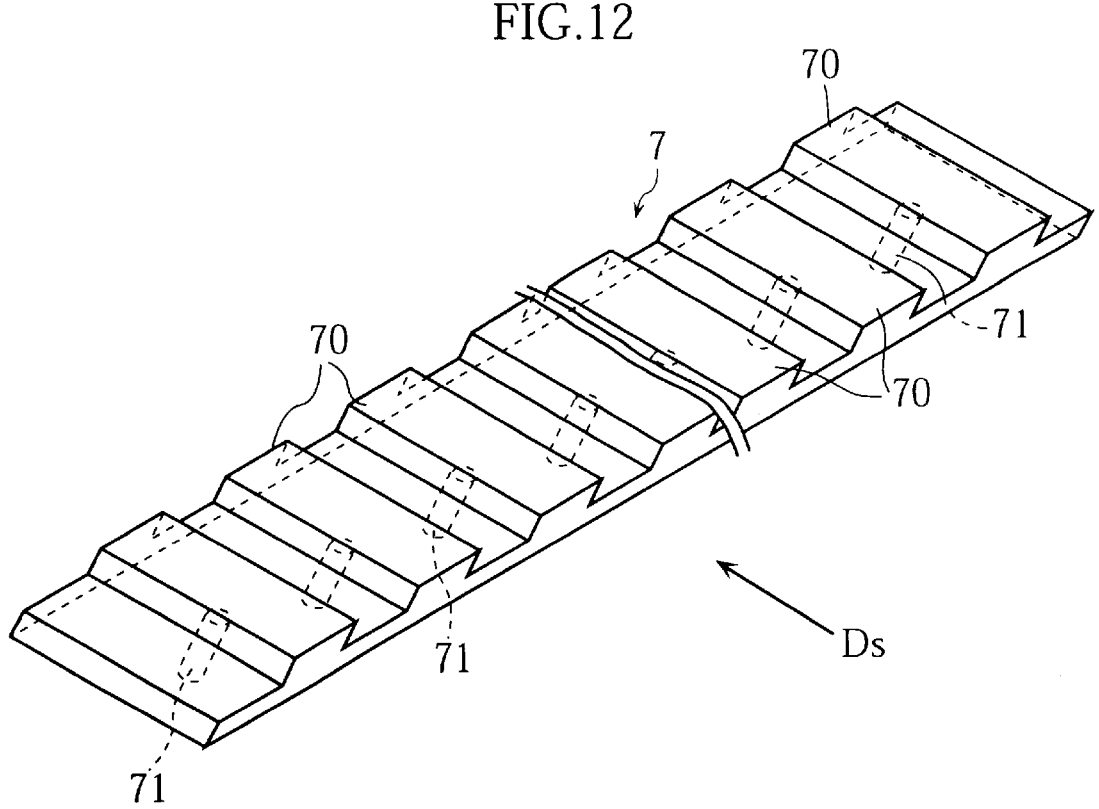
FIG. 12 is a perspective view showing another luminosity-adjusting member used in the image reading apparatus of the fifth embodiment.

As shown in FIG. 12, the lower luminosity adjuster 7 also has an elongated body which is formed with a plurality of second protrusions 70. As illustrated, the second protrusions 70 are spaced from each other longitudinally of the lower luminosity adjuster 7. Each of the second protrusions 70 has a rectangular cross section, as viewed in a direction Ds. The lower luminosity adjuster 7 has a bottom surface formed with a plurality of fixing portions 71 projecting downward from the bottom surface. Correspondingly, the casing 10 is formed with engaging bores 72 into which the fixing portions 71 are fitted (see FIG. 9).

Figure 13:
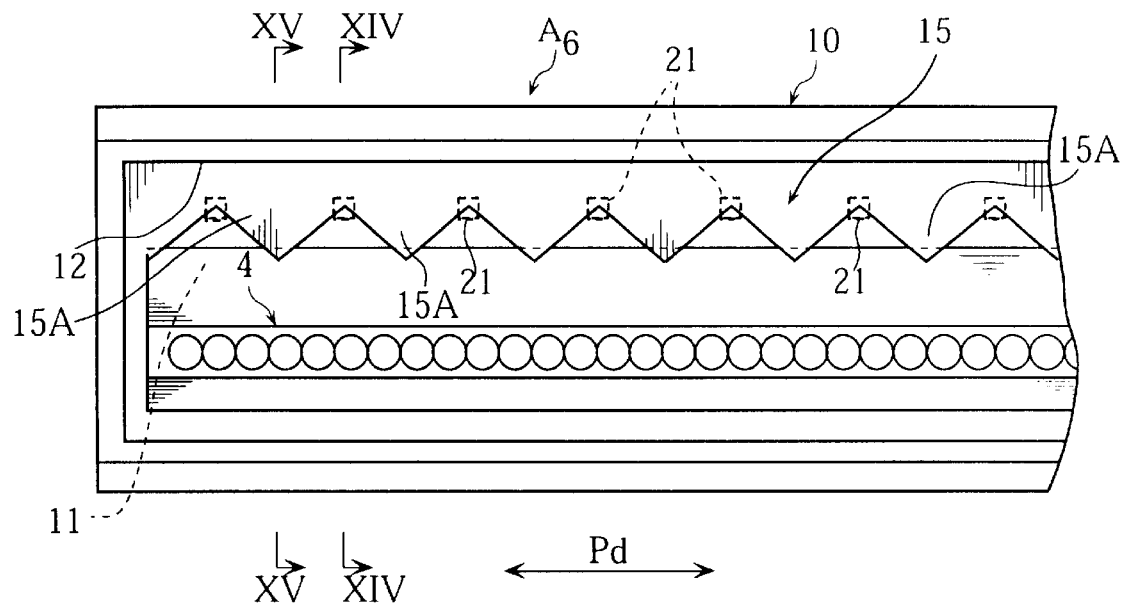
FIG. 13 is a plan view showing principal parts of an image reading apparatus according to a sixth embodiment of the present invention.
Figure 14:
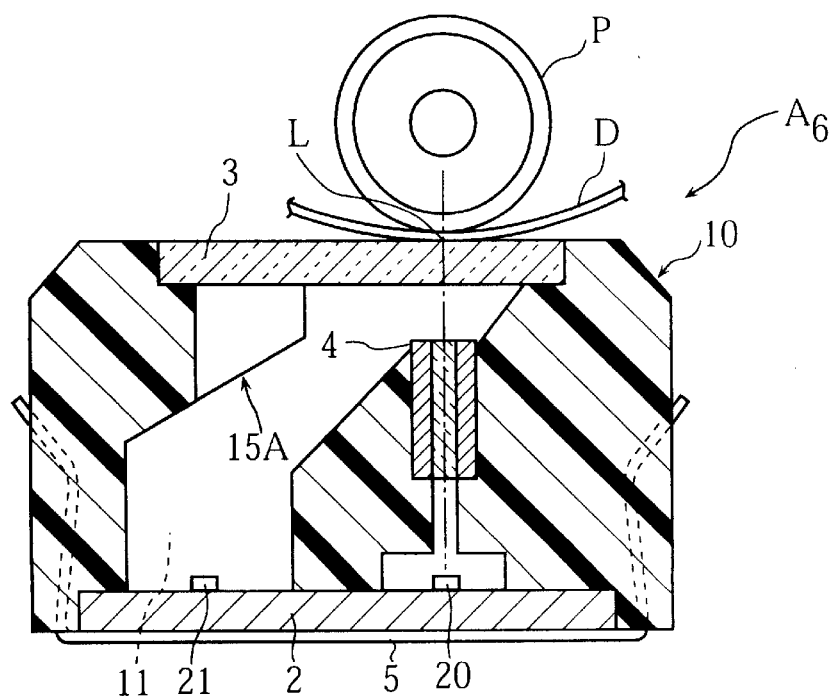
FIG. 14 is a sectional view taken along lines XIV—XIV in FIG. 13.
Figure 15:
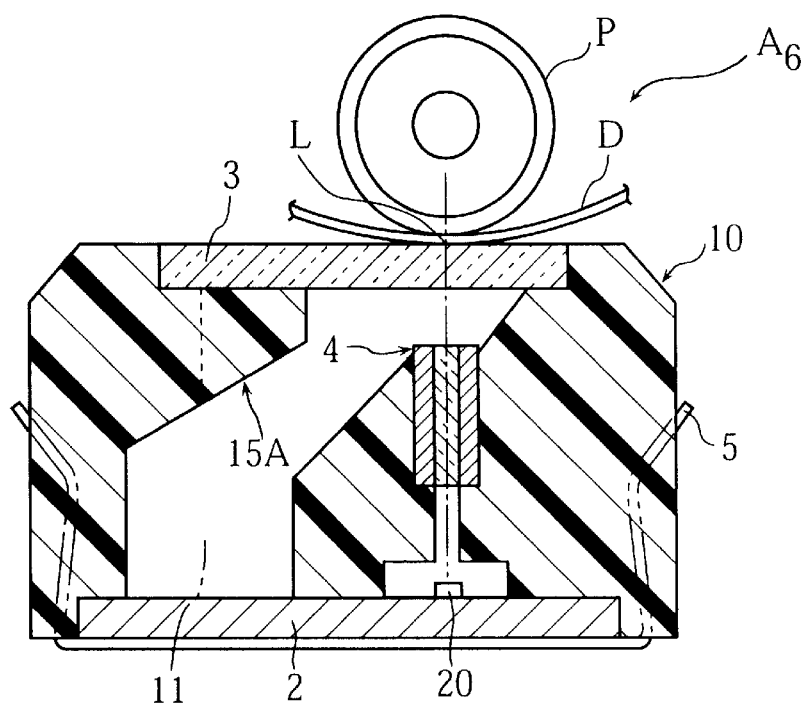
FIG. 15 is a sectional view taken along lines XV—XV in FIG. 13.

Reference is now made to FIGS. 13–15 showing an image reading apparatus A6 according to a sixth embodiment of the present invention. The apparatus A6 of the sixth embodiment is basically similar in arrangement to the apparatus A1 of the first embodiment. However, as will be described below, there is a significant difference between the apparatus A1 of the first embodiment and the apparatus A6 of the sixth embodiment.

Referring to FIG. 13, the image reading apparatus A6 includes luminosity adjuster 15 formed with a plurality of triangular protrusions 15A. These protrusions 15A in themselves are similar to the first protrusions 15a of the first embodiment (FIG. 2). However, according to the sixth embodiment, the apexes Ap of the respective protrusions 15A are positioned between adjacent light sources 21, as viewed in the primary scanning direction Pd. Thus, as clearly shown in FIG. 13, the light sources 21 are not completely hidden under the luminosity adjuster 15 but partially exposed to the exterior as viewed in the vertical direction (see also FIG. 14).

With such an arrangement, part of the light emitted from the light sources 21 is allowed to escape from within the casing 10, thereby not being directed to an image reading line L. In this manner, the luminosity over the image reading line L is equalized.

Figure 16:
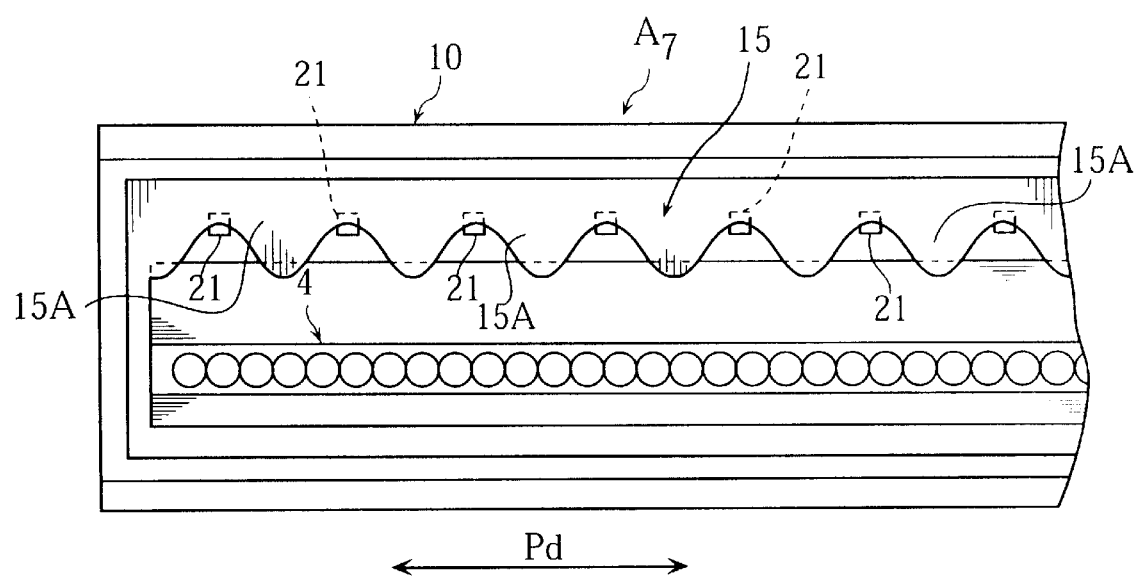
FIG. 16 is a plan view showing principal parts of an image reading apparatus according to a seventh embodiment of the present invention.

FIG. 16 is a plan view showing an image reading apparatus A7 according to a seventh embodiment of the present invention. The image reading apparatus A7 is basically similar in arrangement to the apparatus A6 of the sixth embodiment except for the shape of protrusions 15A of luminosity adjuster 15. Specifically, the protrusions 15A of the seventh embodiment have a smooth, wave-like contour. In this arrangement again, the apexes of the respective protrusions 15A are positioned between adjacent light sources 21, as viewed in the primary scanning direction Pd. Thus, the apparatus A7 enjoys the same advantage as the apparatus A6 does.

Figure 17:
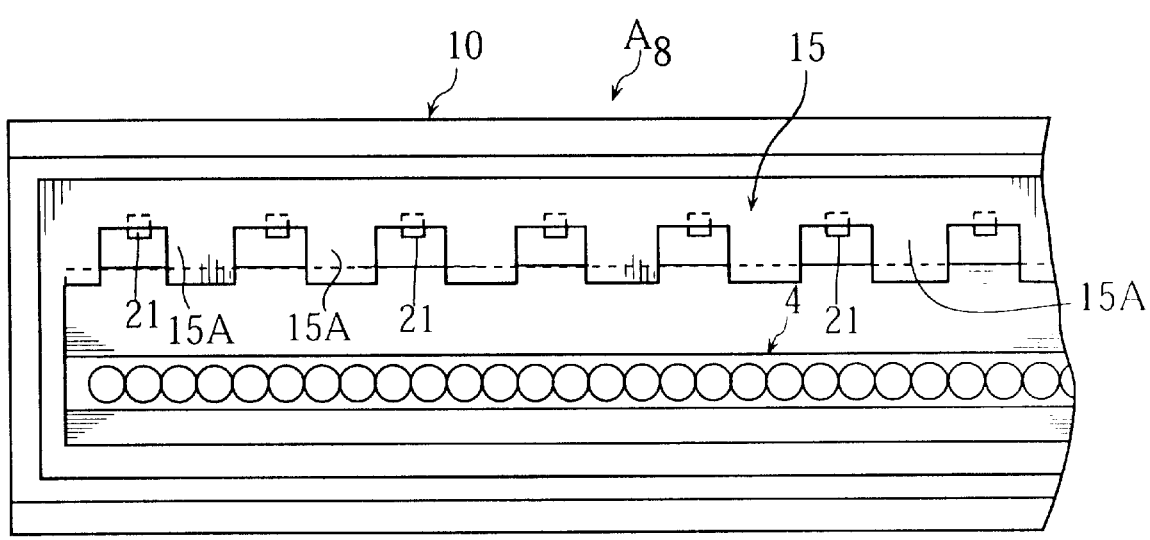
FIG. 17 is a plan view showing principal parts of an image reading apparatus according to an eighth embodiment of the present invention.

FIG. 17 is a plan view showing an image reading apparatus A8 according to an eighth embodiment of the present invention. The illustrated apparatus A8 is basically similar in arrangement to the apparatus A7 of the seventh embodiment, except that luminosity adjuster 15 is provided with a plurality of rectangular protrusions 15A.

Reference is now made to FIGS. 18–22 showing an image reading apparatus A9 according to a ninth embodiment of the present invention.

Figure 18:
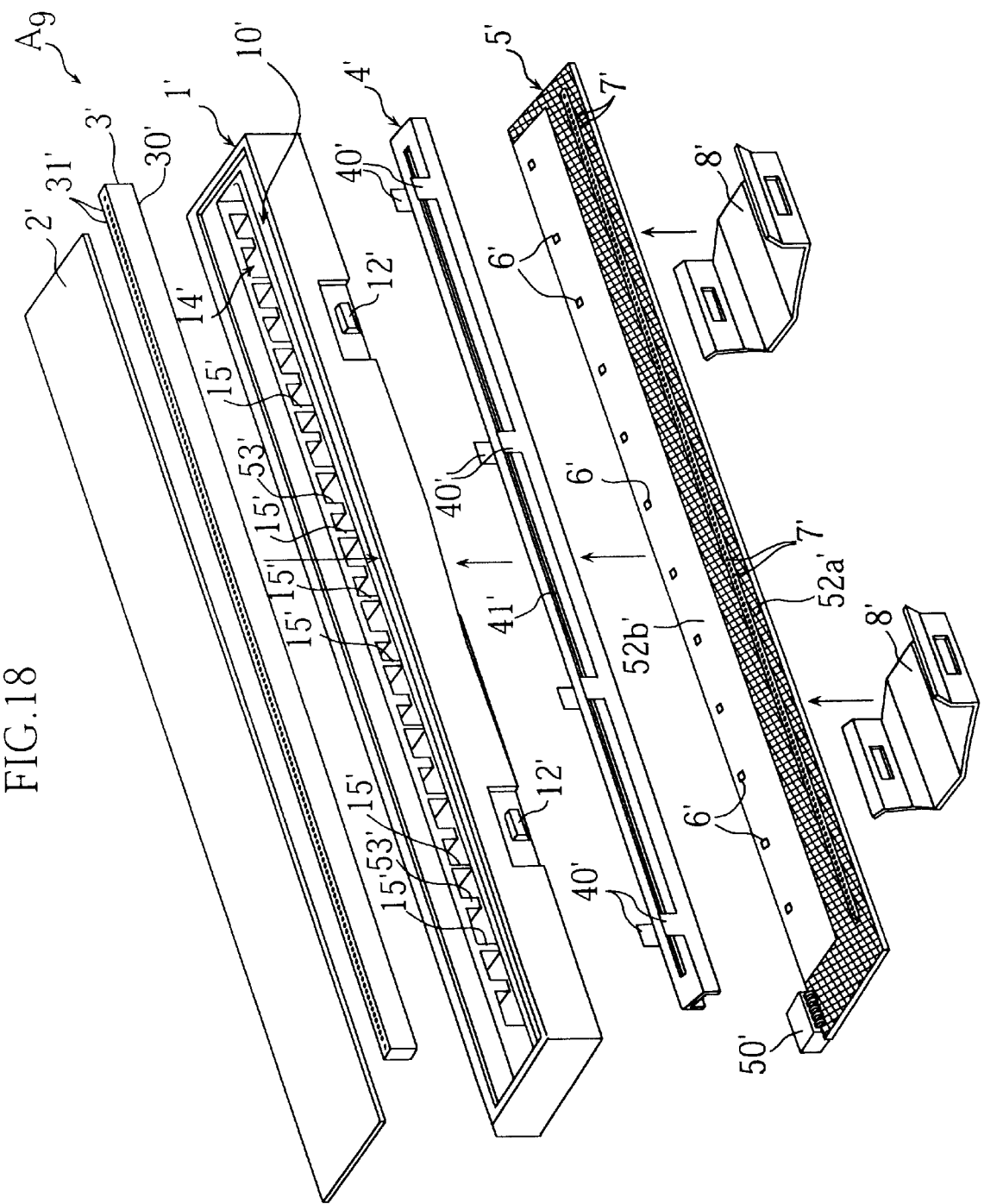
FIG. 18 is an explosive, perspective view showing an image reading apparatus according to a ninth embodiment of the present invention.

Referring to FIG. 18, the illustrated apparatus A9 includes a casing 1' provided with an inner space, a transparent cover 2' for closing the inner space from above, a lens array 3' held within the inner space of the casing 1', a reflection preventing member 4' arranged below the lens array 3', a substrate 5' for closing the inner space of the casing 1' from below, and a pair of attachments 8' for releasably attaching the substrate 5' to the casing 1'. The attachments 8' come into engagement with fixing protrusions 12' formed in longitudinal side walls of the casing 1'.

The casing 1' of the ninth embodiment is made of a white synthetic resin material such as polycarbonate containing titanium oxide. Preferably, surfaces of the casing 17 may have a reflectance of 90–98% so that light is efficiently reflected on them.

The transparent cover 2' is a rectangular thin plate supported by the casing 1'. The cover 2' may be made of a suitable glass or synthetic resin material.

Figure 19:
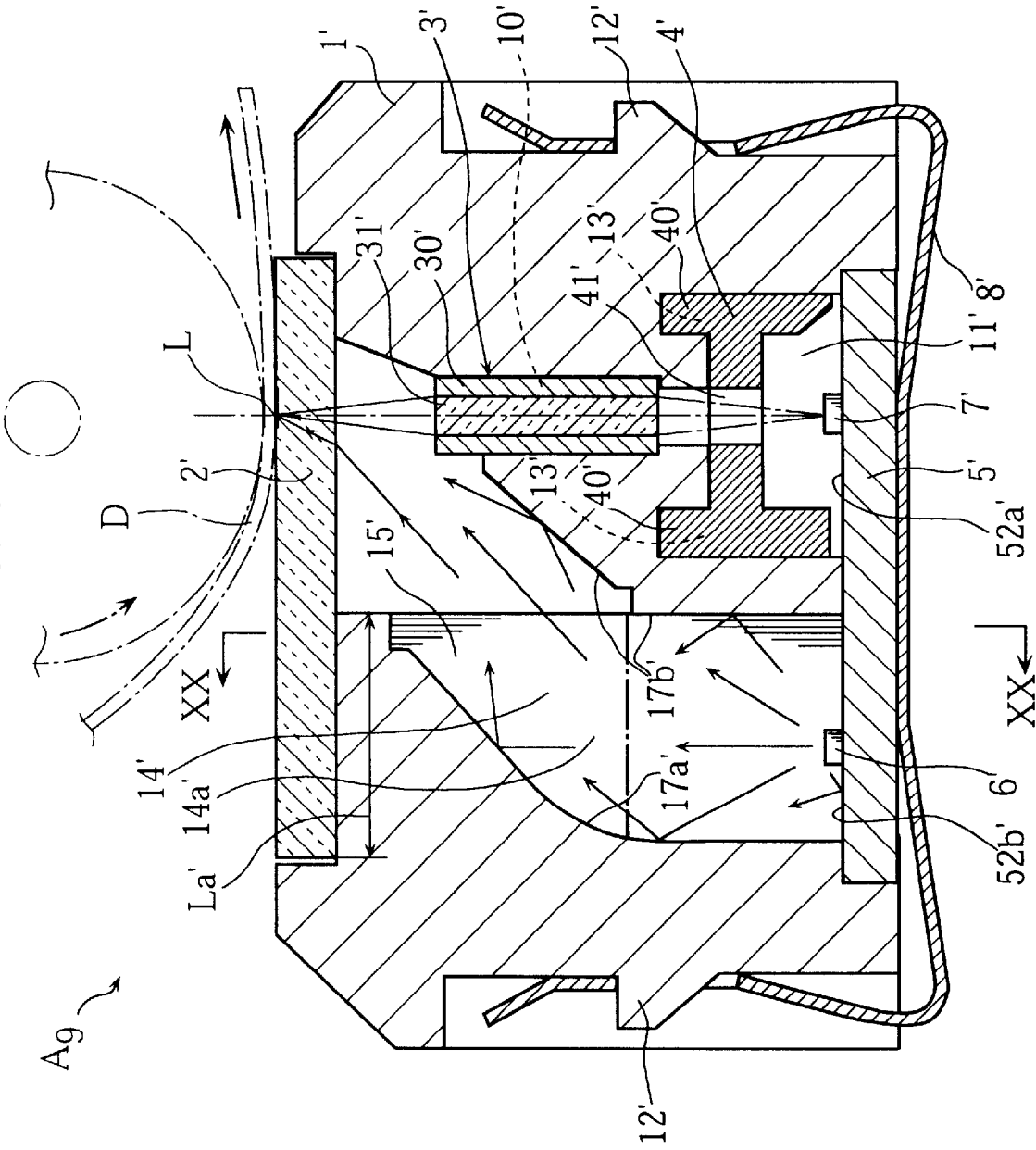
FIG. 19 is a sectional view showing the image reading apparatus of the ninth embodiment.

The lens array 3' includes an elongated holder 30' and a plurality of rod lenses 31' held by the holder 30'. As shown in FIG. 19, the lens array 3' is fitted into a groove 10' formed in the casing 1'. Thus, the lens array 3' is located below the cover 3' to be spaced from the bottom surface of the cover 3' by a predetermined distance.

The reflection preventing member 4' may be made of a black or dark-colored resin material including ABS (acrylonitrile butadiene styrene) resin or polycarbonate, so that the reflection preventing member 4' has a low reflectance. The reflection preventing member 4' is fitted into a downwardly open groove 13' formed in the casing 1'. As shown in FIG. 18, the reflection preventing member 4' is formed with positioning tabs 40' which extend upwardly. These tabs 40' are useful for holding the reflection preventing member 4' in position within the groove 13'.

Figure 22:
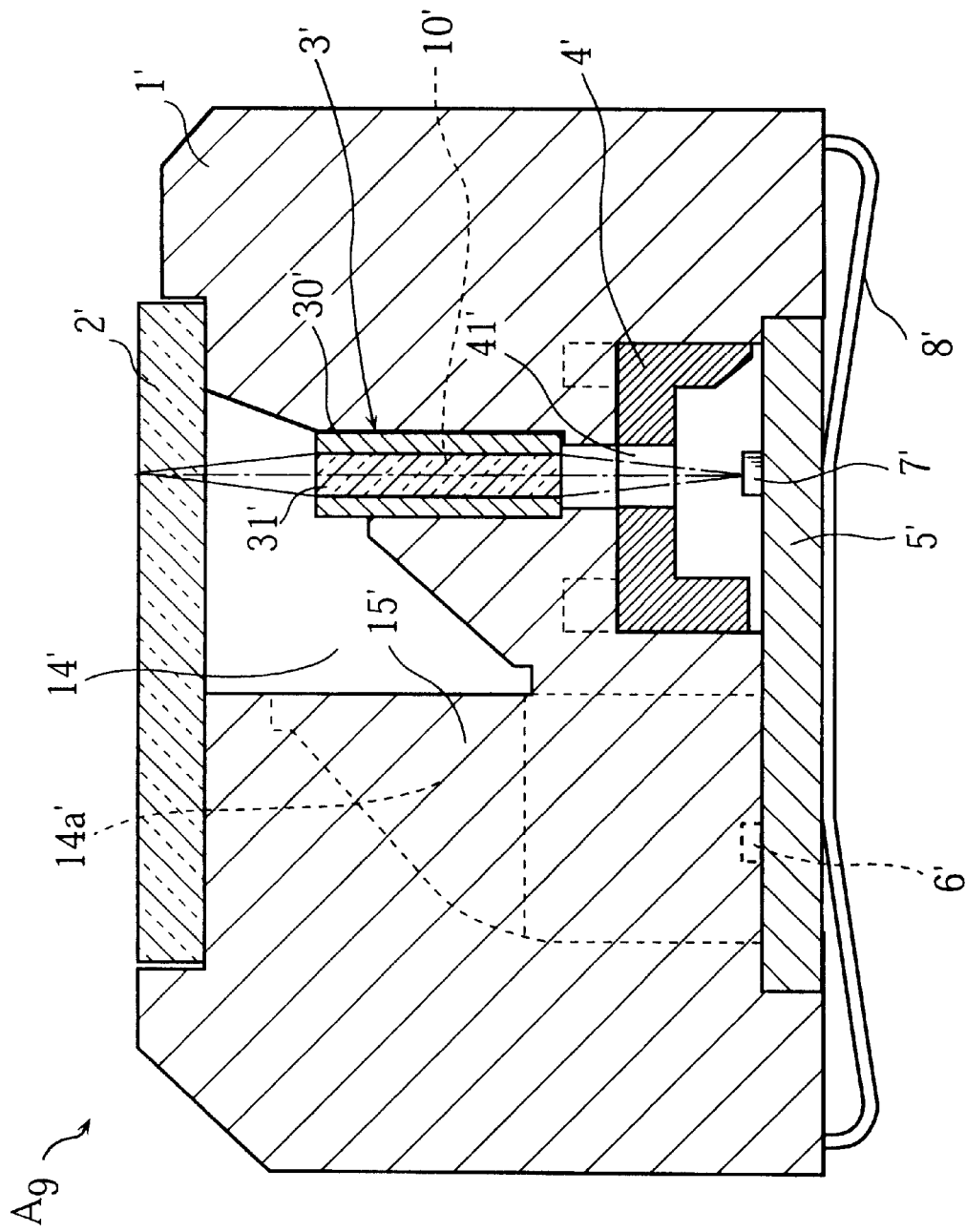
FIG. 22 is a sectional view taken along lines XXII—XXII in FIG. 20.
Figure 23:
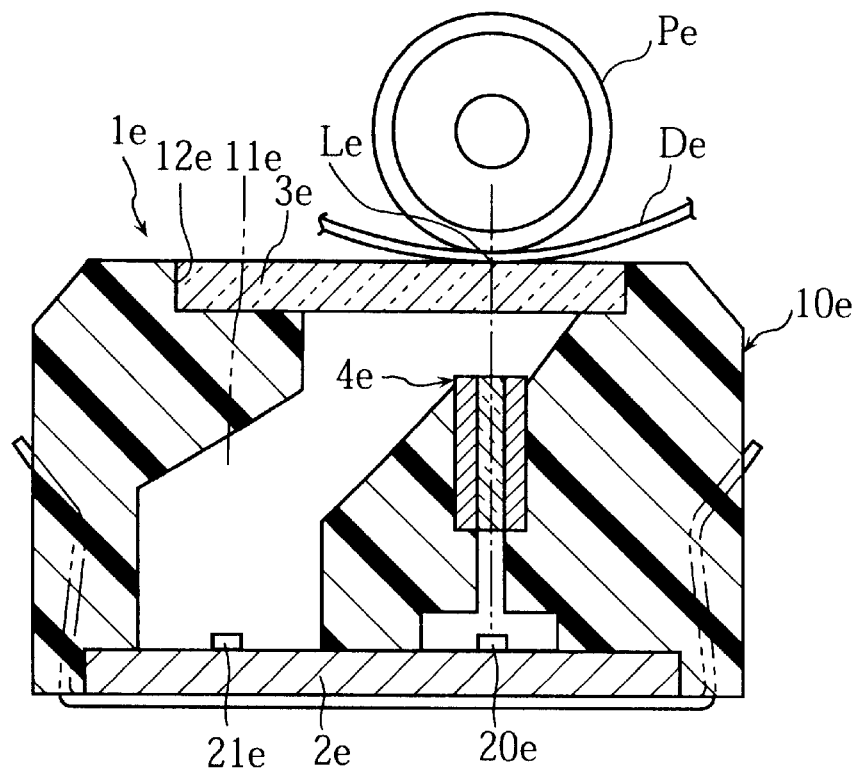
FIG. 23 is a sectional view showing a conventional image reading apparatus.
Figure 24:
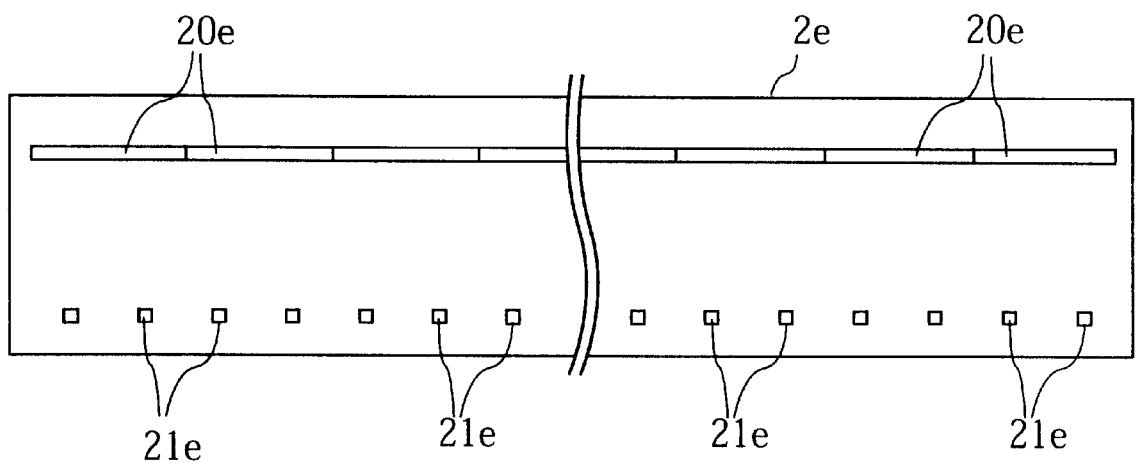
FIG. 24 is a plan view showing arrangements of a substrate used in the conventional image reading apparatus.

As shown in FIGS. 18, 22, the reflection preventing member 4' has a rectangular cross section which is downwardly open. The reflection preventing member 4' is formed, at its upper portion, with a slit 41' extending longitudinally of the reflection preventing member 4'. The slit 41' is provided for allowing passage of light coming from the lens array 3', as shown in FIG. 22.

The substrate 5' may be made of an insulating material such as ceramic or glass-fiber-reinforced epoxy resin. The substrate 5' has an upper surface which is provided with a wiring pattern (not shown) for power supply and conduction of various signals. The substrate 5' supports, at a corner thereof, a connector 50' for electrically connecting an external device (not shown) to the image reading apparatus A9.

The upper surface of the substrate 5' is divided into a black region 52' (the crosshatched region in FIG. 18) and a white region 52b' (the remaining region of the upper surface). In the white region 52b', a plurality of LEDs 6' (as light sources) are arranged in a row extending longitudinally of the substrate 5'. The LEDs 6' are spaced from each other by a predetermined distance. In the black region 52a', a plurality of light receiving elements 7' are arranged in a row extending longitudinally of the substrate 5'.

Referring to FIG. 19, the casing 1' is provided with an inner space 14' defined by a first inner surface 17a' and a second inner surface 17b'. The inner space 14' has nearly the same length as that of the transparent cover 2', as viewed in the primary scanning direction.

For the purposes of effectively leading light emitted by the light sources 6' to the image reading line L, the first and the second inner surfaces 17a', 17b' are curved or bent at a predetermined angle. As stated above, the casing 1' is made of an excellent reflective material, so that light is reflected on the first and the second inner surfaces 17a', 17b' without unduly wasting energy.

When the substrate 2' is attached to the casing 1', as shown in FIG. 19, the highly reflective white region 52b' of the substrate 2' faces the inner space 14', whereas the black region 52a' of low reflectance faces the reflection preventing member 4' across a space 11'.

Figure 20:
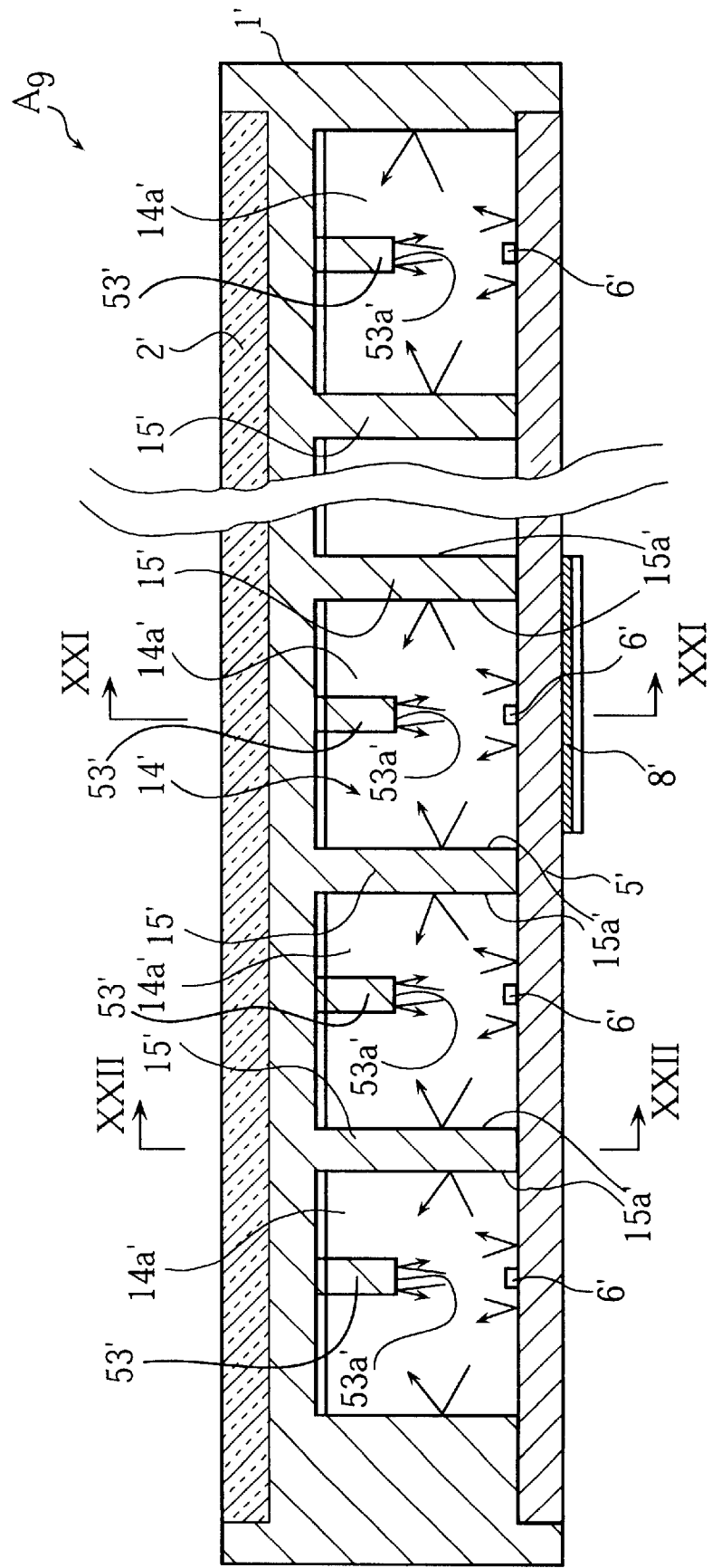
FIG. 20 is a sectional view taken along lines XX—XX in FIG. 19.

As in the cases of the image reading apparatus A1–A8, the image reading apparatus A9 of the ninth embodiment is also provided with luminosity-adjusting means for enabling luminosity equalization along the image reading line L. As shown in FIGS. 18 and 20, the luminosity-adjusting means of the ninth embodiment is made up of a plurality of primary partitions 15' and a plurality of auxiliary partitions 53'. These primary and the auxiliary partitions 15', 53' are formed integral with the casing 1'.

As best shown in FIG. 20, the primary partitions 15' are arranged at regular intervals in the primary scanning direction. Each of the primary partitions 15' is held in contact with the upper surface of the substrate 5'. In this arrangement, the inner space 14' is divided into a plurality of smaller sections 14a'. Each section 14a' contains one light source 6'.

The auxiliary partitions 53' are also arranged at regular intervals in the primary scanning direction in a manner such that only one auxiliary partition 53' is provided between two adjacent primary partitions 15'. As shown in FIG. 20, each of the auxiliary partitions 53' is equally spaced from the adjacent primary partitions 15'. As a result, each auxiliary partition 53' is located above a corresponding light source 6'. The lower end 53a' of the auxiliary partition 53' is spaced from the light source 6' by a predetermined distance (see also FIG. 21). Thus, as viewed vertically, the auxiliary partition 53' is smaller in dimension than the primary partition 15'. The auxiliary partition 53' may have a thickness of 0.5–1.0 mm. Preferably, the thickness of the auxiliary partition 53' is about 0.7 mm.

Referring to FIG. 20, each primary partition 15' has a pair of side surfaces 15a'. According to the present invention, these side surfaces 15a' have an excellent reflectance of 90–98%. The lower end 53a' of each auxiliary partitions 53' also has a reflectance (90–98%).

The image reading apparatus A9 of the present invention has the following advantages.

Figure 21:
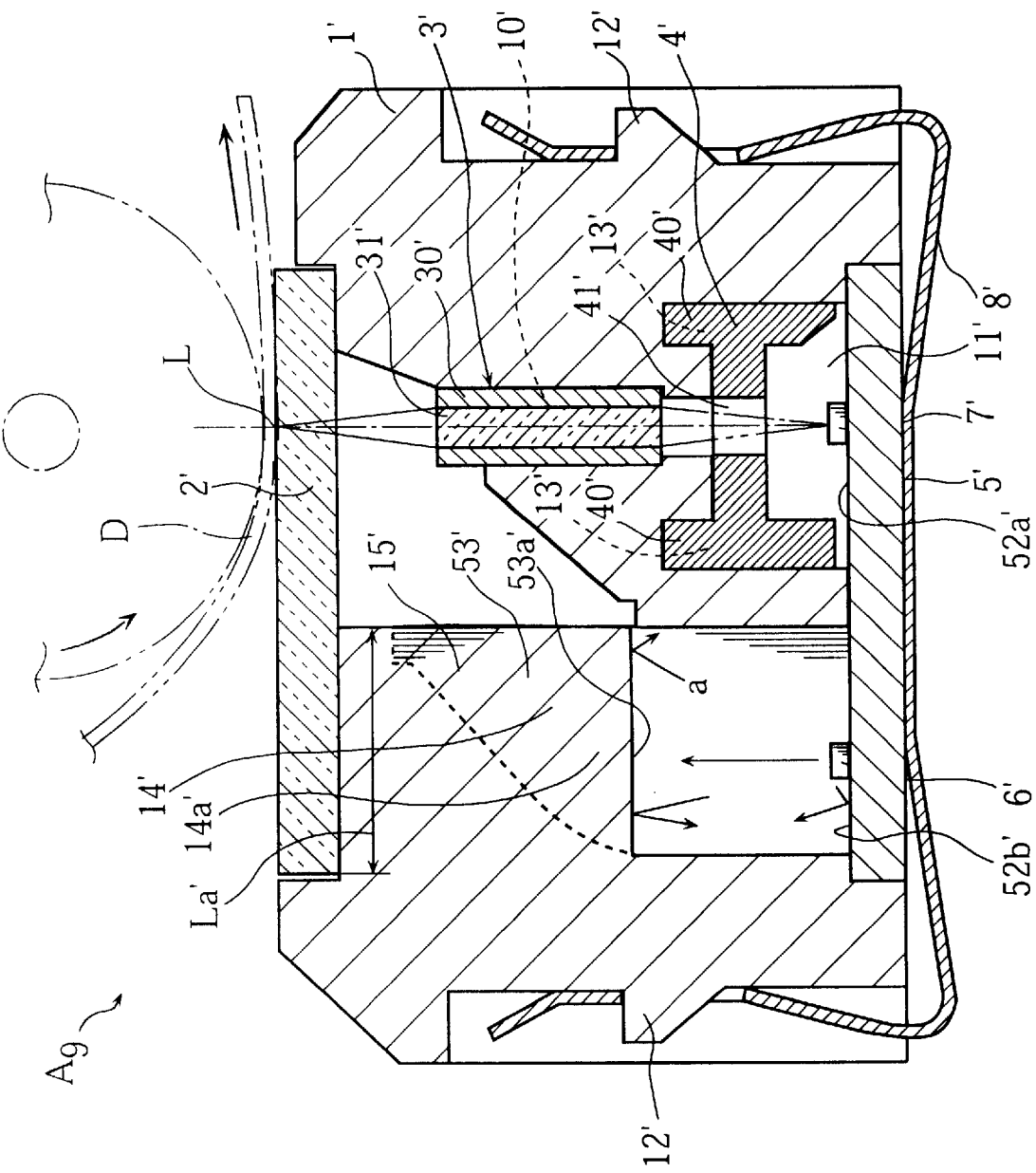
FIG. 21 is a sectional view taken along lines XXI—XXI in FIG. 20.

When power is supplied to the light sources 6', each light source 6' will emit light. Then, as shown in FIGS. 19–21, part of the emitted light will directly reach the lower end 53a' of the auxiliary partition 53' to be reflected on it. The other part of the light may first be reflected on the white region 52b', the side surfaces 15a', the first inner surface 17a' or the second inner surface 17b'.

With the above arrangement, the light emitted from the light sources 6' will uniformly be distributed in the respective sections 14a' by being reflected in the manner described above. Thereafter, the light reaches the image reading line L to illuminate it with a constant luminosity. Since the side surfaces 15a', the white region 52b', the first and the second inner surfaces 17a', 17b' have an advantageously high reflectance, the light reflected on these reflective portions can reach the image reading line L before it loses an unfavorable amount of energy.

Upon reaching the image reading line L, the light is reflected on the document D to be directed downward. Then, the reflected light passes through the rod lenses 31' of the lens array 3' to be finally received by the light receiving elements 7'. Based on the received light, the light receiving elements 7' will output image signals.

In the ninth embodiment, the light receiving elements 7' are covered by the dark-colored reflection preventing member 4', which has a low reflectance. Thus, the light within the space 11' will not be unfavorably scattered by the reflection preventing member 4'. Further, since the light receiving elements 7' are mounted in the black region 52a', the scattering of light at the space 11' is prevented more reliably.

According to the ninth embodiment, the primary-partitions 15' and the auxiliary partitions 53' are formed integral with the casing 1'. Alternatively, it is also possible to produce these partitions separately from the casing 1' and attach them to the casing 1' at a later time with the use of an adhesive.

The above-described image reading apparatus A1–A9 are all contact-type devices. Clearly, the present invention is also applicable to a flatbed-type image reading apparatus.

The present invention being thus described, it is obvious that the same may be varied in many other ways. Such variations should not be regarded as a departure from the spirit and scope of the present invention, and all such modifications as would be obvious to those skilled in the art are intended to be included within the scope of the following claims.

What is claimed is:

1. An image reading apparatus for reading out images printed on a document comprising:

a casing formed with an inner space, the casing being elongated in a primary scanning direction;

a transparent cover supported by the casing, the cover being held in sliding contact with the document at an image reading line;

an insulating substrate attached to the casing;

a plurality of light sources mounted on the substrate for illuminating the image reading line, the light sources being arranged in a first row extending in the primary scanning direction;.

a plurality of light sensors mounted on the substrate for receiving reflected light coming from the image reading line, the light sensors being arranged in a second row extending in the primary scanning direction; and luminosity-adjusting means supported by the casing for equalizing luminosity along the image reading line;

wherein the luminosity-adjusting means includes at least one luminosity adjuster for shielding part of light emitted from the light sources; and wherein said one luminosity adjuster is provided with a plurality of protrusions arranged in the primary scanning direction, each of the protrusions being arranged to positionally coincide with one of the light sources in the primary scanning direction.

2. The image reading apparatus according to claim 1, wherein the luminosity-adjusting means includes an additional luminosity adjuster for shielding part of light emitted from the light sources, the additional luminosity adjuster is arranged below said one luminosity adjuster.

3. The image reading apparatus according to claim 1, wherein said each of the protrusions has a triangular configuration.

4. The image reading apparatus according to claim 1, wherein the luminosity-adjusting means is formed integrally with the casing.

5. The image reading apparatus according to claim 1, wherein the luminosity-adjusting means is formed separately from the casing.

6. An image reading apparatus for reading out images printed on a document comprising:

a casing formed with an inner space, the casing being elongated in a primary scanning direction;

a transparent cover supported by the casing, the cover being held in sliding contact with the document at an image reading line;

an insulating substrate attached to the casing;

a plurality of light sources mounted on the substrate for illuminating the image reading line, the light sources being arranged in a first row extending in the primary scanning direction;

a plurality of light sensors mounted on the substrate for receiving reflected light coming from the image reading line, the light sensors being arranged in a second row extending in the primary scanning direction; and luminosity-adjusting means supported by the casing for equalizing luminosity along the image reading line;

wherein the luminosity-adjusting means includes at least one luminosity adjuster for allowing part of light emitted from the light sources to exit from the inner space of the casing; and wherein said one luminosity adjuster is provided with a plurality of protrusions arranged in the primary scanning direction, each of the protrusions being disposed between two adjacent light sources in the primary scanning direction.

7. An image reading apparatus for reading out images printed on a document comprising:

a casing formed with an inner space, the casing being elongated in a primary scanning direction;

a transparent cover supported by the casing, the cover being held in sliding contact with the document at an image reading line;

an insulating substrate attached to the casing;

a plurality of light sources mounted on the substrate for illuminating the image reading line, the light sources being arranged in a first row extending in the primary scanning direction;

a plurality of light sensors mounted on the substrate for receiving reflected light coming from the image reading line, the light sensors being arranged in a second row extending in the primary scanning direction; and luminosity-adjusting means supported by the casing for equalizing luminosity along the image reading line;

wherein the luminosity-adjusting means includes a plurality of first reflective partitions spaced from each other in the primary scanning direction, each of the first reflective partitions being disposed between two adjacent light sources.

8. The image reading apparatus according to claim 7, wherein each of the first reflective partitions has a reflectance of 90–98%.

9. The image reading apparatus according to claim 7, wherein the luminosity-adjusting means further includes a plurality of second reflective partitions, each of the second reflective partitions being disposed above a corresponding one of the light sources.

10. The image reading apparatus according to claim 9, wherein said each of the second reflective partitions has a bottom surface spaced from said corresponding one of the light sources by a predetermined distance.

11. The image reading apparatus according to claim 10, wherein the bottom surface of said each of the second reflective partitions has a reflectance of 90–98%.

12. An illuminator comprising:

a plurality of light sources arranged in a line extending in a predetermined direction;

a plurality of first reflective partitions spaced from each other in the predetermined direction, each of the first reflective partitions being disposed between two adjacent light sources; and a plurality of second reflective partitions each of which is disposed above a corresponding one of the light sources.

13. The illuminator according to claim 12, wherein said each of the first reflective partitions has a reflectance of 90–98%.

* * * * *